United States Patent [19]
Rakity et al.

[11] Patent Number: 5,671,446
[45] Date of Patent: Sep. 23, 1997

[54] METHOD AND APPARATUS FOR ATOMICALLY ACCESSING A QUEUE IN A MEMORY STRUCTURE WHERE LIFO IS CONVERTED TO FIFO

[75] Inventors: Philip M. Rakity, San Francisco, Calif.; Mark D. Rustad, Edina, Minn.

[73] Assignee: Apple Computer, Inc., Cupertino, Calif.

[21] Appl. No.: 406,189

[22] Filed: Mar. 16, 1995

[51] Int. Cl.$^6$ ............... G06F 13/00; G06F 7/00
[52] U.S. Cl. ............ 395/874; 395/250; 395/873; 395/732; 395/736
[58] Field of Search ............... 395/873, 874, 395/490, 491, 732, 477, 250, 736

[56] References Cited

U.S. PATENT DOCUMENTS

| | | | |
|---|---|---|---|
| 4,298,954 | 11/1981 | Bigelow et al. | 395/250 |
| 5,111,385 | 5/1992 | Hattori | 395/484 |
| 5,502,822 | 3/1996 | Takebe | 395/310 |
| 5,539,896 | 7/1996 | Lisle | 395/477 |

OTHER PUBLICATIONS

PowerPC 601 RISC Microprocessor User s Manual, 1993, Chapter 3, pp. 53–55, 10–105, 10–197, Appendxi G.
MC68020 32–Bit Microprocessor User s Manual, 1985, 1984 by Motorola, Inc. Appendix B, pp. 54,55.
VAX Hardware Handbook by Digital, 1980, Chapter 17, pp. 311–317.
VAX 11 Architecture Handbook by Digital, 1979,, pp. 188–195.

*Primary Examiner*—Richard L. Ellis
*Assistant Examiner*—Gautam R. Patel
*Attorney, Agent, or Firm*—Hickman Beyer & Weaver, LLP

[57] ABSTRACT

A method and apparatus for storing and retrieving data from a queue implemented on a computer system. A queue memory structure is allocated in a memory device, the queue including a a last-in-fast-out (LIFO) and a first-in-first-out (FIFO). A data element is atomically added to the LIFO when the data element is enqueued to the queue structure, and a data element is atomically removed from the FIFO when the data element is to be dequeued from the queue, thus preventing concurrent processes from disordering the data in the queue. When the FIFO becomes empty, the LIFO is converted to a new FIFO, and this new FIFO is stored in place of the old (empty) FIFO. In one embodiment, a lock is set and the LIFO is converted to a new FIFO only when the lock is previously determined to be clear to prevent additional dequeuers from interrupting a dequeuing process. A high-priority data element can be atomically added to a head list that stores the data element at the front of the queue memory structure. The present invention allows multiple enqueuers and dequeuers on one or more processing elements, including interrupt handlers and other programs, to access the queue without altering interrupt levels and without risk of deadlock.

43 Claims, 10 Drawing Sheets

METHOD AND APPARATUS FOR ATOMICALLY ACCESSING A QUEUE IN A MEMORY STRUCTURE WHERE LIFO IS CONVERTED TO FIFO

BACKGROUND OF THE INVENTION

The present invention relates generally to computer systems, and more particularly to methods for inserting and removing data from a queue implemented by a computer system.

Memory structures are used frequently when implementing processes on computer systems. Two memory structures that are often implemented in a variety of applications are the first-in-first-out (FIFO) or queue, and the last-in-first-out (LIFO) or stack. Data is stored in a sequence in both types of memory structures: in the queue, the data is retrieved in the same order in which it was stored, while in the stack, the data is retrieved in the reverse order in which it was stored.

Many types of operating systems, application programs, and other programs make use of queues. For example, the Power Macintosh by Apple Computer Inc., of Cupertino, Calif., uses an operating system that makes use of a general queue for storing sequential requests for the operating system to perform. While the operating system is performing one request, additional requests are stored on the queue and are implemented in the order that they arrived. Such buffering activities are a common use of queue memory structures in other applications as well, such as when receiving data at a communications port of a computer. The incoming data at a communications port may be received at a faster rate than the data can be processed, and a queue allows the two data rates to be synchronized by inserting or "enqueuing" incoming data on the queue at the incoming data rate and removing or "dequeuing" data at the rate of the processor.

In some applications, multiple "enqueuers" and/or "dequeuers" are desired. An enqueuer is a microprocessor, interrupt handler, software routine, or other implemented process that can enqueue data from a queue. Similarly, a dequeuer is a process or processor that can dequeue data from a queue. Multiple enqueuers and dequeuers may all have access to a particular queue and thus can each store and remove data from the queue. For example, in single processor systems, each task has access to one or more shared queues to store and retrieve shared data. Typically, each task raises interrupt levels which will suspend operations of other tasks so that the interrupting task can enqueue or dequeue data.

A problem with queues in both single enqueuer/dequeuer and multiple enqueuer/dequeuer systems occurs when an enqueuer or dequeuer is in the process of performing a data operation (storing or retrieving data) at the front or "head" of the queue and an interrupting process performs a data operation from the queue at the same time. This can lead to data being stored or retrieved in the improper order and can thus lead to both the enqueuer/dequeuer and the interrupting process retrieving the wrong data, i.e. the proper sequence of data stored in the queue is not maintained. A similar problem occurs with multiple enqueuer/dequeuer systems when the interrupting process is an additional enqueuer/dequeuer. For example, a first microprocessor (dequeuer) may attempt to retrieve data from the queue, and a second microprocessor (dequeuer) interrupts the first microprocessor in an attempt to retrieve data from the queue. The interrupting dequeuer might retrieve the data that was meant to be retrieved by the first dequeuer, and the first dequeuer would retrieve the next data in the queue that was meant to be retrieved by the interrupting dequeuer. It is thus possible that both dequeuers would thus dequeue the wrong data.

Some measures can be taken to make a queue safe for multiple enqueue/dequeue processes to use. For example, interrupt processes can be decreased in priority level (or the enqueue and dequeue operations for user tasks or other data can be increased in priority level), or the interrupts can be blocked, so that interrupt processes cannot interfere with queuing operations. However, on many computer platforms, raising or lowering the interrupt levels can be costly in terms of computing resources or is simply not allowed. For example, for the Power Macintosh computer, only one level of interrupt is provided which cannot be raised or lowered by user tasks. On systems which do provide multiple interrupt levels, the raising and lowering of these levels can cause a significant decrease in interrupt performance for the computer system. For example, the time to process an interrupt will be delayed if other tasks raise the interrupt level and the interrupt must wait for the levels to be lowered. Also, on some systems like the Power Macintosh, an interrupt handler is emulated, so that utilizing interrupts causes emulation instructions to be processed and increases processing time. Furthermore, there is the possibility when altering interrupt levels that "deadlock" can occur, in which an interrupting process may wait forever for a condition to be cleared; however, the condition cannot be cleared until the interrupting process finishes its operations, resulting in a deadlock. Lastly, in multiple microprocessor systems, the processors cannot use interrupt levels to ensure exclusive use of a resource, since each processor has its own interrupts and there is typically no link between processors to coordinate access to the resource.

In other systems, atomic instructions can be used to provide a safe memory structure that provides data in the correct order. "Atomic" instructions allow tasks to modify an address uninterrupted by any other process' access to that address. In the prior art, atomic accesses to a shared memory structure for use with multiple microprocessors have been implemented. For example, in the VAX II Architecture Handbook, Digital Equipment Corporation, 1979, and the VAX Hardware Handbook, Digital Press, 1980-81, a multiple processor system is described in which a processor can atomically remove or insert data from a shared memory structure. Similarly, in the Motorola 68020 Reference Manual, the described CAS instruction provides atomic enqueue and dequeue operations. However, to provide atomic access to memory in these implementations, a memory bus lock out is provided so that one processor or task can lock the memory bus when using the memory to prevent any other processor or task from interrupting its memory accesses. One problem with these implementations is that they are very specific to certain types of hardware and memory bus architectures. The prior art implementations would have to be greatly modified anchor completely redesigned for each type of computer architecture, and may not be able to be implemented with some computer systems.

What is needed is a queue memory structure that does not require altering the level of interrupts or blocking interrupts to provide safe and proper data retrieval from the queue. What is further needed is a system-portable, generic queue memory structure that is safe for use with multiple microprocessors and other enqueuers/dequeuers without having to adjust the priority levels or access of interrupts and user tasks and with no risk of deadlock.

SUMMARY OF THE INVENTION

A method and apparatus of the present invention provides a queue memory structure to be used by processes implemented on one or more computer systems. Interrupt levels and other data levels do not have to be altered for the queue to provide a safe storage area for data. In addition, multiple microprocessors and other dequeuers can use the queue memory structure of the present invention safely and efficiently. The queue is easily implemented in any type of computer architecture which provides atomic operations, thus providing a generic solution for shared and cross-platform memory structures.

More particularly, a method for storing and retrieving data from a queue implemented on a computer system comprises a step of allocating a memory structure in a memory device, the memory structure having a last-in-first-out (LIFO) and a first-in-first-out (FIFO). A data element is added to the LIFO when the data element is enqueued to the queue, and a data element is removed from the FIFO when the data element is to be dequeued from the queue. When the FIFO becomes empty, the LIFO is converted to a new FIFO, and this new FIFO is stored in place of the old (empty) FIFO. The steps of adding a data element to the LIFO and removing a data element from the FIFO are performed atomically. The step of converting the LIFO to a new FIFO includes atomically removing data elements of the LIFO from the queue memory structure and reversing the elements to create a FIFO. Preferably, a lock is set and the LIFO is converted to the new FIFO only when the lock is previously determined to be clear; this prevents additional dequeuers from interrupting a dequeuing process. The lock is atomically set preferably using a compare and swap operation. Furthermore, a data element can preferably be atomically added to a head list that stores the data element at the front of the queue memory structure. The data element stored in the head fist can preferably be atomically removed from the front of the queue.

A preferred computer apparatus in accordance with the present invention includes a digital processor, read/write memory, and a mechanism for providing a queue memory structure in the read/write memory. The queue memory structure implements a last-in-first-out (LIFO) and a first-in-first-out (FIFO). The apparatus includes a mechanism for enqueuing a data element to the queue by adding the data element to the LIFO, and a mechanism for dequeuing a data element from the queue by removing the data element from the FIFO. Finally, a mechanism for converting the LIFO to a new FIFO when the FIFO is empty is also included. The LIFO includes data elements stored as a LIFO linked list and a LIFO pointer pointing to said LIFO linked list of data elements, and the FIFO includes a FIFO linked list and a FIFO pointer pointing to the FIFO linked list of data elements. The mechanism for converting the LIFO to a new FIFO preferably includes a mechanism for atomically checking/setting a lock and converting the LIFO to a new FIFO when the lock is not set. Additionally, a head list and a mechanism for adding a data element to a front of the queue by adding the data element to the head list are preferably included in the apparatus. Preferably, multiple enqueuers and dequeuers have access to the queue memory structure.

In another method for enqueuing and dequeuing data on a computer system in accordance with the present invention, data is atomically enqueued to a queue memory structure when a call to enqueue is received by the computer system. Similarly, data is atomically dequeued from the queue memory structure when a call to dequeue is received by the computer system. The enqueuing and dequeuing steps are performed without altering the level of interrupts used on the computer system and without the risk of deadlock. The enqueuing step includes inserting the data into a LIFO, and the dequeuing step includes removing the data from a FIFO; the LIFO is converted into the FIFO when appropriate. Dequeuing data includes atomically checking and setting a lock flag before converting the LIFO into the FIFO, wherein the LIFO is not converted when the lock flag has been previously set. The dequeuing step can be performed by a plurality of dequeuers, including different microprocessors, each having access to the queue memory structure. In a general case, when one of the dequeuers is dequeuing data and has set the lock flag, a second one of the dequeuers is informed that the queue memory structure is empty. In more particular cases, the second dequeuer can be informed to wait until the lock is clear before attempting to perform the dequeuing step.

A computer system for providing a queue memory structure in accordance with the system includes a LIFO for storing data elements input to the queue memory structure, a FIFO for storing data elements to be output from the queue memory structure, a mechanism for converting the LIFO to the FIFO, at least one enqueuer for storing data elements in the LIFO, and a dequeuer for retrieving data elements from the FIFO. The enqueuer and dequeuer perform their respective steps atomically, and a head list stores data elements enqueued to the front of the queue memory structure. One or more dequeuers that can access the queue can be interrupt routines, microprocessors, etc. When multiple dequeuers are used, a mechanism for atomically checking and setting a lock is provided when the means for converting converts the LIFO to the FIFO.

The queue memory structure of the present invention atomically enqueues and dequeues data. This allows a queue to operate without having to raise or lower interrupt levels on a system. Furthermore, multiple microprocessors, interrupt handlers, and other dequeuers can access the queue without risk of loss of data, retrieving improper data, deadlock, or other mishap.

These and other advantages of the present invention will become apparent to those skilled in the art upon a reading of the following specification of the invention and a study of the several figures of the drawing.

DETAILED DESCRIPTION OF THE PREFERRED EMBODIMENT

The present invention is well suited for both single processor and multiple processor computer systems. Since the queue memory structure of the present invention is a general-purpose structure that can be implemented by any operating system or computer system, the computer apparatus embodiments described herein are shown for the purposes of illustration. The present invention is suitable many types of computer systems, such as mainframe systems, keyboard based systems, pen-based systems, voice-based systems, etc.

Figure 1:
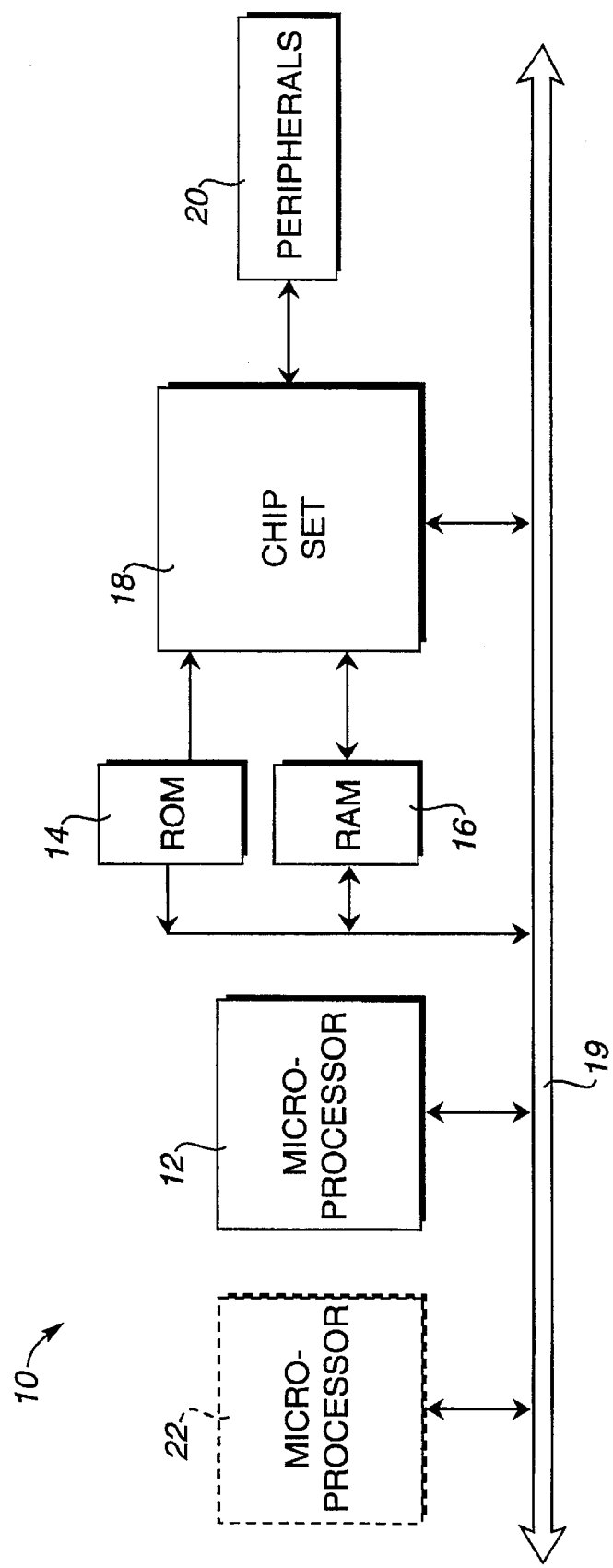
FIG. 1 is a block diagram of a computer system in accordance with the present invention.

As shown in FIG. 1, a computer system 10 in accordance with the present invention includes a microprocessor 12, read only memory (ROM) 14, random access memory (RAM) 16, a chip set 18, peripherals 20, and additional microprocessor 22.

The microprocessor 12 is preferably a commercially available, single chip microprocessor, and is preferably a reduced instruction set computer (RISC) chip such as the Power PC microprocessor available from Motorola, Inc. or IBM Corp. Alternatively, the microprocessor can be a complex instruction set computer (CISC) chip such as the 68040 microprocessor available from Motorola, Inc. Microprocessor 12 is coupled to ROM 14 by a data/control/address bus 19. ROM 14 can contain the basic operating system for the computer system 10. Microprocessor 12 is also connected to RAM 16 by bus 19 to permit the use of RAM 16 as scratch pad memory and to preferably store the memory structure of the present invention, as described below. Microprocessor 12 is also coupled to chip set 18 by bus 19 to permit data transfers with peripheral devices and memory.

Chip set 18 is used to perform a variety of functions including input/output (I/O) between memory, peripherals 20, and microprocessor 12. Chip set 18 can include one or more application specific integrated circuit (ASIC) as well as other components such as registers, direct memory access (DMA) controllers, etc., as is well known to those skilled in the art. For example, one ASIC can be used to interface microprocessor 12 with ROM 14 and RAM 16, and a different ASIC can be used to interface the microprocessor 12 with peripherals 20. Peripherals 20 are devices used by computer system 10 and can include storage units such as a disk drive unit or nonvolatile memory such as flash memory. Other peripheral devices that can be coupled to chip set 18 include a display screen or display assembly, modem, printer, network interface, CD-ROM drive, etc.

Additional microprocessor 22 is also optionally coupled to bus 19. Microprocessor 22 can be similar to microprocessor 12 or a different type of microprocessor. Microprocessor 22 can preferably share RAM 16 so that the memory structure of the present invention can be used by both microprocessors 12 and 22. The implementation of multiple microprocessor systems are well known to those skilled in the art. Microprocessors in addition to microprocessor 22 can also be coupled to bus 19 to provide three, four, or more microprocessors in computer system 10 or external to computer system 10.

Figure 2:
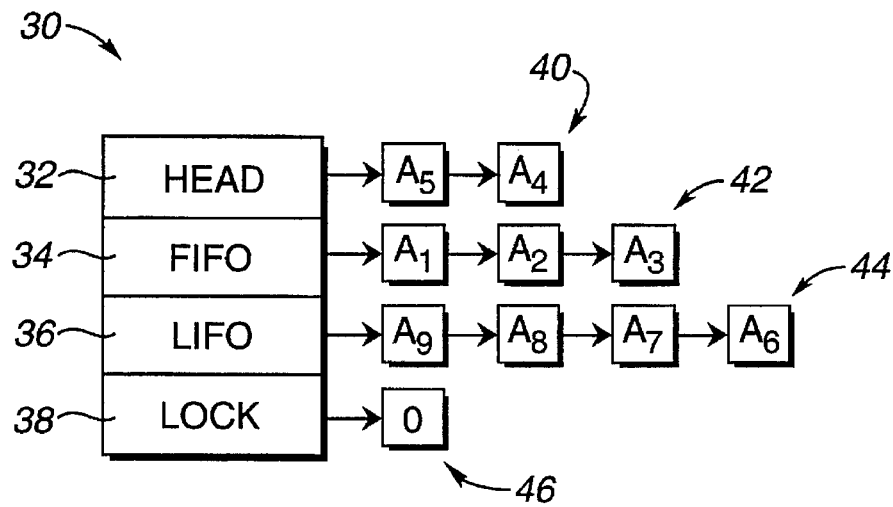
FIG. 2 is a diagrammatic illustration of a queue memory structure of the present invention.

FIG. 2 is a diagram showing a preferred memory structure 30 of the present invention for implementing a queue. Queue memory structure 30 includes four pointers stored in memory, such as RAM 16 or another storage device, that point to the beginning of separate linked lists also stored in memory. The element of the linked lists may be stored anywhere in available memory and are linked through the use of pointers in a linked list, as is well known to those skilled in the art of linked lists. If multiple processes, microprocessors, enqueuers, dequeuers, etc. are making use of the same queue memory structure 30, then structure 30 should be stored in an area accessible by all these processes, such as in a shared memory, as is well known to those skilled in the art.

Memory structure 30 implements a queue. As is well known to those skilled in the art, a queue allows data elements to be stored in the queue, also known as "enqueuing," and allows the data elements to be retrieved from the queue in the same order that they were stored, also known as "dequeuing." The present invention provides multiple pointers and manipulates elements pointed to by the pointers to simulate a queue memory structure.

Memory structure 30 includes pointers that preferably include a head 32, a first-in-first-out (FIFO) list pointer 34, a last-in-first-out (LIFO) pointer 36, and a lock pointer 38. Head 32 and lock pointer 38 are optional such that their inclusion in memory structure 30 depends on the applications of the queue 30 in computer system 10. Thus, in other embodiments, only FIFO pointer 34 and LIFO pointer 36 are included in memory structure 30. As used herein, the term "queue" will generally refer to the entire queue memory structure 30 that includes pointers 32, 34, 36 and 38 and which, to the user of the memory structure, operates like a standard FIFO. The term "FIFO" or "FIFO list", as used herein, will refer only to the FIFO linked list 42 pointed to by FIFO pointer 34, which is a component of queue 30.

Head 32 is a pointer to an optional linked list 40 of data elements, which includes data element A5 and data element A4 in the example of FIG. 2. Head 32 stores data elements which are to be dequeued before the elements of FIFO 42. Higher priority data can thus be added to head list 40 to be dequeued before the lower priority data elements of FIFO list 42. Head list 40 stores data elements in a LIFO order. Thus, element A4 was enqueued to head list 40, followed by element A5; element A5 will be first dequeued from head list 40, followed by element A4. The data elements pointed to by FIFO pointer 34 are dequeued after the head list 40, as described subsequently.

FIFO pointer 34 points to a FIFO linked list 42 of data elements similar to the head list 40 of elements pointed to by head 32. FIFO pointer 34 points to the FIFO linked list 42 of data elements, which includes element A1, element A2, and element A3 in the example of FIG. 2 (Both head linked list 40 and FIFO linked list 42 are also together referred to as a "FIFO" herein). These elements are provided in the order that they were initially stored in memory structure 30; for example, element A1 was original enqueued into memory structure 30 before element A2, which was enqueued before element A3. When dequeuing, element A1 is retrieved first, followed by element A2 and then element A3, which is the same order as enqueuing. When FIFO list 42 is empty and another dequeuing operation is received, the elements of the LIFO linked list 44 are organized into a new FIFO list 42 and are pointed to by FIFO list pointer 34, as described below.

LIFO pointer 36 is a pointer to a LIFO linked list 44 of data elements similar to the lists described above. LIFO pointer 36 points to the list 44 of data elements including elements A9, A8, A7, and A6 (LIFO linked list 44 is also referred to as the "LIFO"). LIFO pointer 36 points to the linked list of elements that have been enqueued into memory structure 30. Unlike the FIFO list 42, the LIFO linked list 44 stores elements in the reverse order that they were input, so that the last input element is the first element in the list, as is well known to those skilled in the art. When FIFO list 42 includes no more elements and a dequeuing request is received, the LIFO linked list 44 pointed to by LIFO pointer 36 is reversed, thus converting it into a FIFO list. The FIFO pointer 34 is then set to point to this new FIFO list, and LIFO pointer 36 is set to null until another element in enqueued. This process is described in greater detail below.

Lock pointer 38 points to a flag element 46. Element 46 stores a value indicating whether the LIFO list 44 is available to a dequeuer to retrieve a data element. A dequeuer may dequeue a data element from head list 40 (if not empty) or FIFO list 42 if such elements are present. If no elements are present in lists 40 or 42, the dequeuer can reorder the LIFO list 44 if the lock is not set, i.e. element 46 stores a zero value. However, if the lock is set, i.e., element 46 stores a 1 value, then a dequeuer may not reorder the list 44 and the dequeuer is preferably told that the queue 30 is empty (given a null value). Lock pointer 38 is described in greater detail with respect to FIG. 11.

Figure 2A:
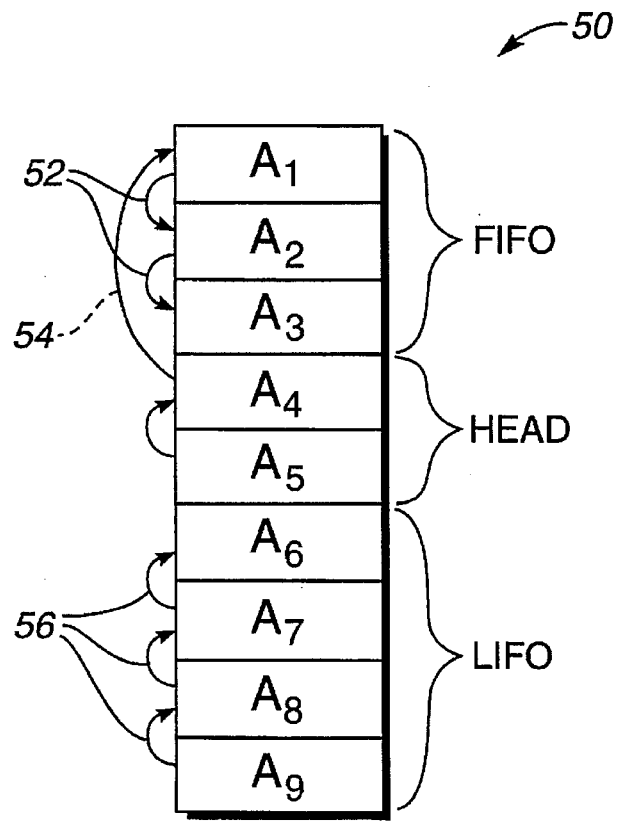
FIG. 2a is a diagrammatic illustration of the elements of the queue memory structure shown in FIG. 2.

FIG. 2a is a diagram of data elements arranged in a sequential memory space 50 such as RAM 16. Elements A1, A2, and A3 of the FIFO linked list 42 pointed to by the FIFO pointer 34 are sequentially stored in the first three locations of memory space 50 and are linked by pointers 52. Elements A4 and A5 of head linked list 40 are stored next in memory space 50, where element A4 has a "logical link" 54 to element A1 of linked list 42. The logical link represents that the next element after A4 to be dequeued is A1, but the link is accomplished through an implemented process rather than an actual link in a linked list. Finally, elements A6, A7, A8, and A9 of LIFO linked list 44 pointed to by LIFO pointer 36 are stored in the last locations of memory space 50 and are linked by pointers 56.

In alternate embodiments, data elements can be stored in other types of structures besides linked lists particular to a specific application. For example, the data elements can be stored in consecutive addresses in memory, although this implementation does not allow the versatility of linked lists.

Figure 3:
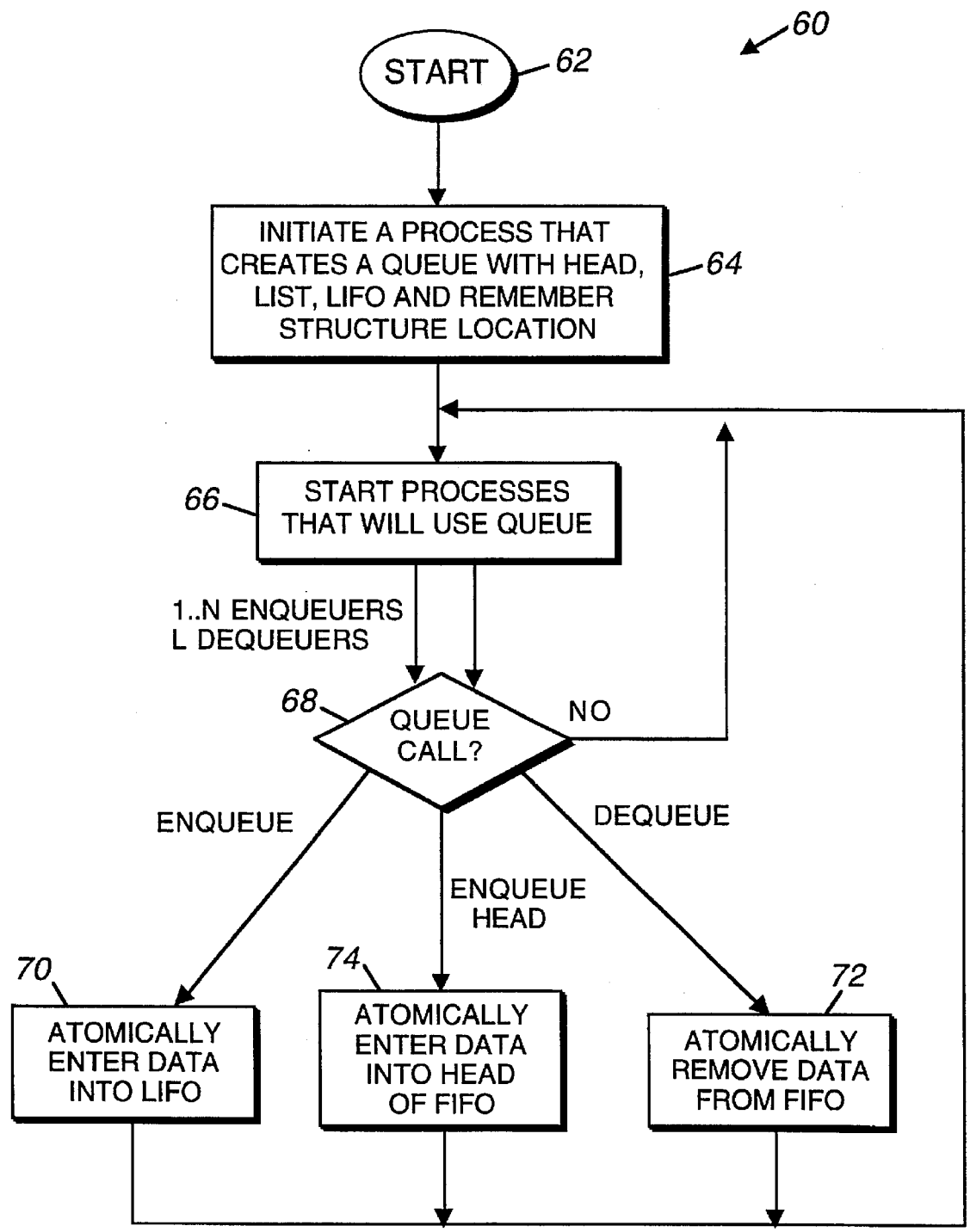
FIG. 3 is a flow diagram of the method of atomically accessing the queue memory structure of the present invention.

FIG. 3 is a flow diagram illustrating a method 60 of the present invention for enqueuing and dequeuing from a queue memory structure. Method 60 can be implemented as hardware, using logic gates and other hardware components, as software stored in ROM 14, RAM 16, or another storage device, or as both hardware and software, implementing some functions in either form. The method begins at 62, and, in step 64, a process is initiated that creates a queue 30 with a head, FIFO, and LIFO, as shown in FIG. 2. The queue is created in memory and the location in memory is remembered so that data can be added to the queue. For example, if an application program is launched by an operating system, queue 30 can be created when the application program is launched so that it will be able to access the queue immediately. One or more queues of the present invention can be created as an operating system is being first initiated upon power-up of a computer system.

In step 66, processes are started that will use the queue. For example, a process within an application program is implemented by an operating system. To make use of the queue of the present invention, the process is passed the location of the queue. The process of the application program can enqueue and dequeue data elements to the queue memory structure by accessing a "library routine" that implements the method of the present invention, i.e. a section of code accessible as a general operation or process, such as a "dequeue" routine and "enqueue" routine. Other examples of processes that would use the queue include an operating system which would use the queue to schedule user tasks, an input/output program which would use the queue to buffer incoming data or outgoing displayed data, etc.

In step 68, the process checks if one or more queue calls have been made by one or more (1 to N) enqueuers or (L) dequeuers. An enqueuer is a process that intends to store a value in the queue, such as an application program or an interrupt handler that stores data in the queue. An enqueuer for the present invention implements the enqueuing method described herein. Several enqueuers may operate at once to store data in the queue; these data elements will be stored in a particular queue order that is the same as the order to dequeue the data elements. Similarly, a dequeuer is a process that intends to retrieve a value that was previously stored in the queue and implements the dequeuing method described herein, such as a user application task that requires data, a server process retrieving data, or an interrupt routine. One or multiple dequeuers can retrieve data from the queue in embodiments of the present invention, as described in greater detail subsequently. Both enqueue and dequeue operations can also occur simultaneously.

If the queue is called in step 68 to enqueue data to the queue memory structure, then step 70 is implemented, in which data is atomically entered into the LIFO 44. This has the effect of entering a data element to the end or "tail" of the queue implemented by queue memory structure 30. The data element is "atomically" enqueued, which herein means that the enqueuer writes to an address of the LIFO linked list 44 uninterrupted by any other process access to that address. This atomic characteristic is important to the present invention to prevent interrupts or other dequeuers in the computer system from causing data to be enqueued in the wrong order. Using the atomic operations and the process of the present invention, interrupt priority levels do not have to be altered, since the present process is interrupt-safe. In multi-processor systems, use of atomic operations are important to prevent microprocessors from interrupting a read or write operation to the queue by a different microprocessor, which can cause wrong data to be enqueued or dequeued. The atomic enqueuing operation of step 70 is described in greater detail with reference to FIG. 4. After the data has been enqueued, the process returns to step 66.

If the queue is called in step 68 to dequeue data from the queue memory structure 30, then step 72 is implemented, in which data is atomically removed from the head list 40 or the FIFO list 42 as shown in FIG. 2. Similar to the atomic enqueue operation described above with reference to step 70 above, an atomic dequeuing operation of the present invention prevents interrupting processes from causing data to be dequeued in the wrong order. This process is described in greater detail with respect to FIG. 7. The dequeued data is provided to the calling dequeuer and the process then returns to step 66.

If the queue is called in step 68 to atomically enqueue data to the head of the queue memory structure, then step 74 is implemented, in which the data is entered into the head 32 of the queue. This process is described in greater detail with respect to FIG. 10. This is an optional step that is provided to systems that incorporate different priority levels of data or that have some other need to enqueue to the head of a queue. A specific instruction is typically provided by the enqueuer in such systems to enqueue to the head rather than to the tail (LIFO) of the queue 30. Such a call can occur when a process wishes to store one or more data elements that have higher priority than data elements already stored in the queue. For example, data elements representing text characters can be enqueued and then dequeued before they are displayed on a display screen. If a user viewing the displayed characters enters a command to halt the display of characters to the screen, then this command can be encoded as a data element and be given priority over the other character data elements. The "halt" priority data element can be entered to the beginning of the queue by entering the data in the linked list 40 of head 32. A "continue" data element can be added to the end of the queue; the display software can thus delete all character data in the queue between the "halt" element and the "continue" element to halt the display of characters.

Once the data has been enqueued to the head, the process returns to step 66. Some implementations of the present invention will not require a head 32 to the queue; for example, no type of data may have priority over other types of data in a particular system, and thus a call to enqueue data to the head of the queue would not exist.

Figure 4:
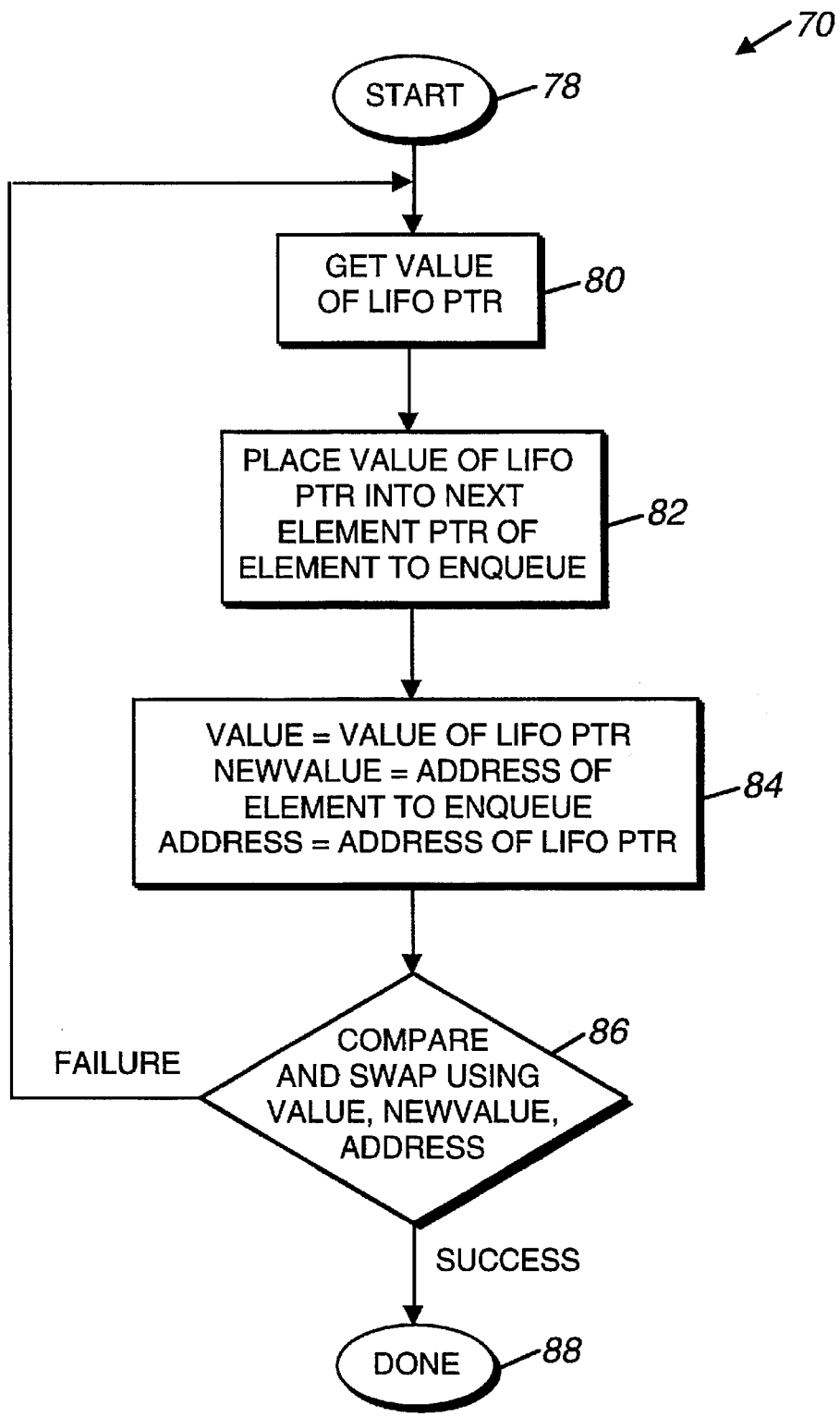
FIG. 4 is a flow diagram illustrating the step of FIG. 3 of atomically entering data into the LIFO of the present invention.

FIG. 4 is a flow diagram illustrating step 70 of FIG. 3, in which data is atomically entered into the queue data structure 30. The entered data element is added to the tail of queue 30, which is the beginning of a LIFO linked list 44 of data elements pointed to by LIFO pointer 36. When a new data element is to be enqueued, the new element is added to the beginning of the LIFO linked list and the LIFO pointer 36 is assigned to point to the newest element. The process begins at 78, and in a step 80, the value of LIFO pointer 36 is retrieved, i.e. the address to which LIFO pointer 36 is pointing. In next step 82, the value of LIFO pointer 36 is placed into the next element pointer of the data element that is to be enqueued into LIFO list 44. Accordingly, the data element to enqueue now points to the data element that LIFO pointer 36 used to point to. In step 84, values are assigned to VALUE, NEWVALUE, and ADDRESS, which are data items used by next step 86. VALUE is assigned to the value of LIFO pointer 36 (i.e., the address pointed to by LIFO pointer 36), NEWVALUE is assigned the address of the element to enqueue, and ADDRESS is assigned the address of LIFO pointer 36.

In step 86, a compare and swap operation is performed using the values of VALUE, NEWVALUE, and ADDRESS as assigned in step 84. The importance of using a compare and swap operation in step 86 is that it is an "atomic" operation, which means that the operation attempts to read or write to an address uninterrupted by any other access to that address. As explained above, this atomic characteristic is important to prevent enqueuers and dequeuers in a system from causing the wrong data to be enqueued or dequeued.

The compare and swap operation of step 86 compares two values and either stores a new value in place of an old value (success) or informs the queuing process that the comparison was a failure. The compare and swap operation is described in greater detail with respect to FIG. 5. If the result of the compare and swap operation is success, then the LIFO pointer 36 now points to the value of the element to enqueue and the element to enqueue has effectively been inserted at the tail of the queue memory structure 30 and the process is complete at 88. For example, referring to FIG. 2, if a new data element A10 were to be enqueued, the next element pointer of new element A10 would be assigned to point to element A9. The link from LIFO pointer 36 to element A9 would be removed and LIFO pointer 36 would be atomically assigned to point to new element A10. Any other new data elements that are enqueued would be added to the LIFO in a similar fashion.

If result of the compare and swap operation is failure, then the process returns to step 80 to again get the value of LIFO pointer 36 and go through the process until success is achieved with the compare and swap of step 86. A failure result is described in greater detail with respect to FIG. 5.

Figure 5:
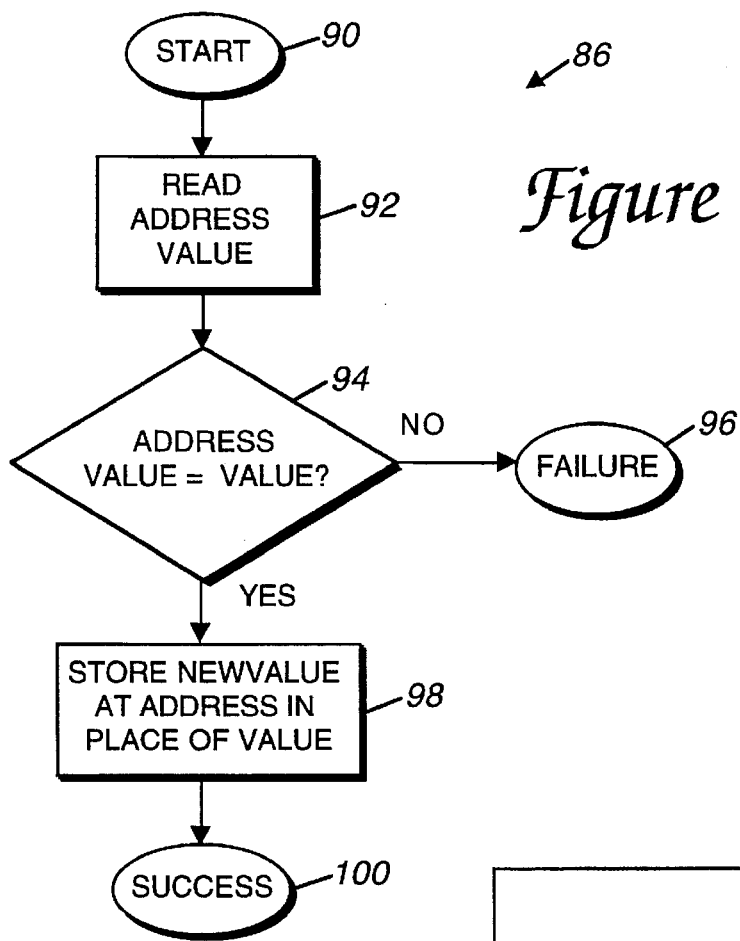
FIG. 5 is a flow diagram illustrating the step of FIG. 4 of implementing the atomic compare and swap operation.

FIG. 5 is a flow diagram illustrating the compare and swap operation 86 of FIG. 4, which atomically stores NEWVALUE in place of VALUE or provides a "failure" result. The process begins at 90, and, in a step 92, the value of ADDRESS is read in, i.e., the value stored at ADDRESS, specified as the address of LIFO pointer 36 in step 84 of FIG. 4, is retrieved. In step 94, this value is compared to VALUE, specified as the value of LIFO pointer 36 in step 84 of FIG. 4. Step 94, in effect, checks if the value stored at the memory location of the LIFO pointer has changed since it was read as VALUE into a register (or other temporary storage space) in step 84 of FIG. 4. If the value of LIFO pointer 36 has changed, it is due to another enqueue process that has enqueued another data element to LIFO list 44 before step 86 was initiated. In such a case, LIFO pointer 36 would point to a different address, and the previously-retrieved VALUE will not equal the current value at ADDRESS in step 94. If so, failure is the result, as indicated at 96. The compare and swap operation tells the controlling process accessing the compare and swap operation (such as a microprocessor, etc.) that failure has occurred, and the "failure" path is taken in the flow as shown in FIG. 4.

In step 94, if the value stored at ADDRESS is equal to VALUE stored in a register, then the value stored at ADDRESS has not changed due to any interrupting processes to LIFO pointer 36, and step 98 is implemented. In step 98, NEWVALUE is stored at ADDRESS in place of VALUE; i.e., another access or process has not changed VALUE so it is safe to store NEWVALUE in place of VALUE. LIFO pointer 36 would thus be set to point to the address of the new enqueued element. This is a "success" result as shown at 100, and the flow continues accordingly as shown in FIG. 4.

Compare and swap is a primitive operation that is well-known to those skilled in the art. For example, in the IBM 360 mainframe computer or Motorola 68020 microprocessor, an atomic compare and swap instruction is provided by the instruction set. In other computer systems or instruction sets, the compare and swap operation is not provided as an instruction. In these systems, an equivalent operation to compare and swap can typically be built using more primitive atomic instructions. For example, in the Power Macintosh by Apple Computer, a compare and swap operation can be built using the atomic instructions "lwarx" and "stwcx," as is well known to those skilled in the art.

Figure 6:
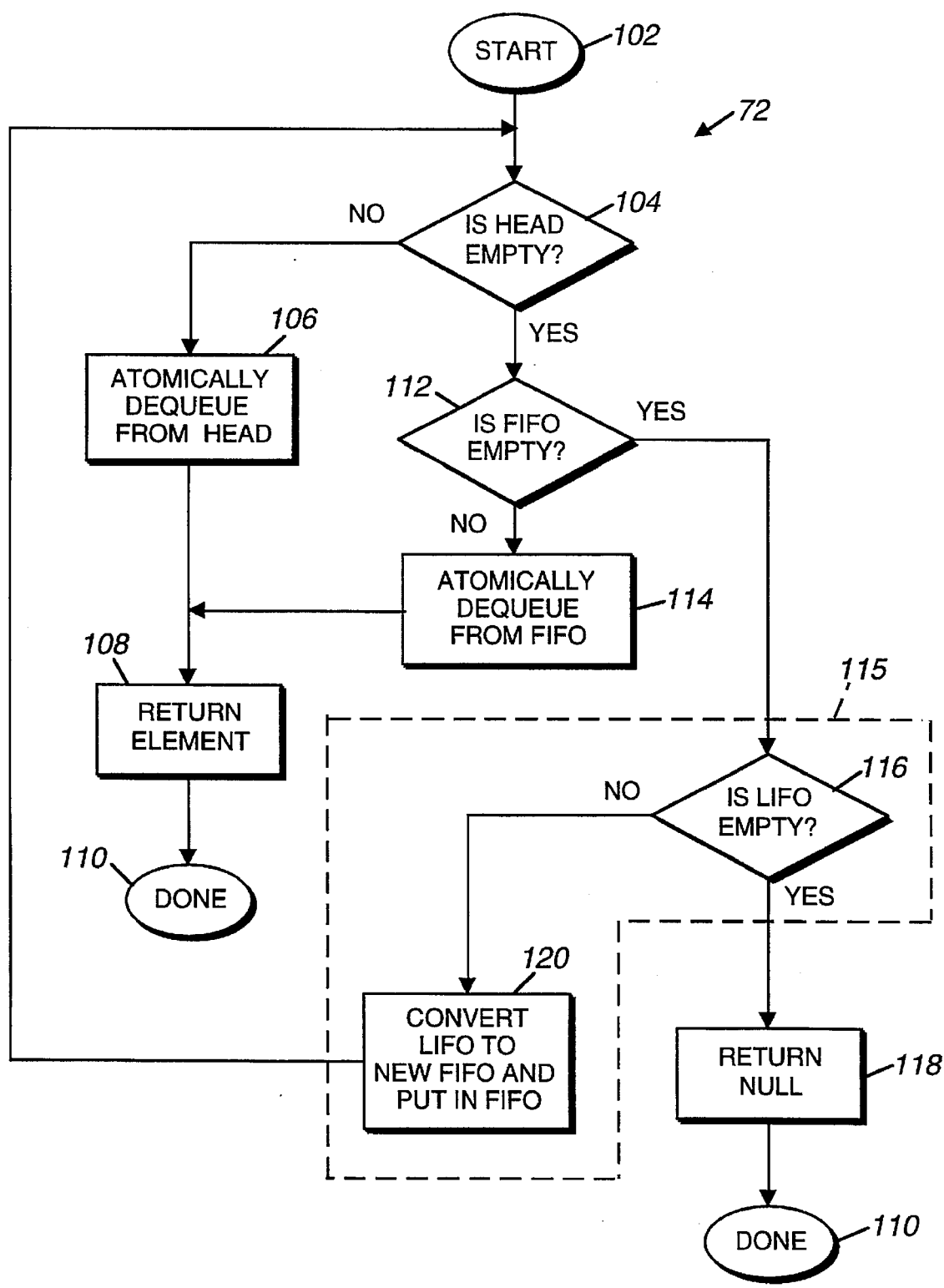
FIG. 6 is a flow diagram illustrating the step of FIG. 3 of atomically removing data from the FIFO of the present invention.

FIG. 6 is a flow diagram illustrating step 72 of FIG. 3, in which a data element is removed from the FIFO list 42 when data is dequeued from the queue memory structure 30. The removed data element is removed from the front of queue 30, which is the linked list 40 of data elements pointed to by head 32 (or FIFO list 42 if head list 40 is empty). The process begins at 102, and, in a step 104, the head list 40 is first checked if it is empty, i.e., if head 32 has a null value. If not, then step 106 is implemented, in which a data element is atomically dequeued from head list 40. Atomically dequeuing an element from the head list 40 is the opposite procedure to enqueuing a data element, and is quite similar to dequeuing from the FIFO list 42, described below with respect to step 114. Differences between dequeuing from the head 32 and FIFO list 42 include that, when dequeing from the head, VALUE would have the value of the head 32, and ADDRESS would have the value of the address of head 32. For example, if a data element is to be dequeued from the head list 40 of the queue memory structure shown in FIG. 2, then element A5 would be removed from the linked list 40 by reassigning the pointer of head 32 to point to element A4 (the pointer of A5 to A4 does not matter, since the element is being dequeued). The dequeued element is returned to the calling process in step 108, and the process is complete at 110.

If the head 32 is empty in step 104, or if no head list 40 is implemented in a specific embodiment, then step 112 is implemented, in which the FIFO list 42 is checked for data elements. If FIFO pointer 34 is pointing to one or more data elements, then step 114 is implemented, in which the first data element is atomically dequeued from the FIFO list 42 pointed to by FIFO pointer 34. This first data element is removed from FIFO list 42 as described in detail with reference to FIG. 7. The dequeued data element is returned to the calling process in step 108, and the process is complete at 110.

If the FIFO list 42 is empty in step 112 (i.e., FIFO pointer 34 is a null pointer), then the process continues to step 116, in which the LIFO list 44 is checked to determine if it is empty. If LIFO pointer 36 is a null pointer, there are no data elements stored in the memory structure to dequeue, and a null is returned to the calling dequeuer in step 118. The process is then complete at 110. If the LIFO pointer 36 is not null in step 116, then step 120 is implemented, in which the LIFO linked list is reversed into a new FIFO and is put in list 42, i.e., FIFO pointer 34 is assigned to point to the new FIFO list that was converted from the LIFO list. Step 120 is described in greater detail with respect to FIG. 8. Once the LIFO list has been converted, LIFO pointer 36 has a value of null, and the process returns to step 104. Subsequently, when the process flow reaches step 112, the FIFO pointer 32 will not be null since the data elements formerly in the LIFO are now pointed to by the FIFO pointer.

Steps 116 and 120 are implemented as shown in one embodiment of the present invention in which one or more enqueuers can enqueue data from the queue data structure 30, but only one dequeuer (i.e., L=1) can safely dequeue data (multiple writers, single reader). In implementations where more that one dequeuer is used, including dequeuing interrupt routines, steps 116 and 120 within dashed line 121 are altered. The alternate embodiment of the steps enclosed by dashed line 121 is shown and described in greater detail with respect to FIG. 11.

Enqueuing operations can simultaneously be accomplished at the same time dequeuing is occurring. Newly enqueued elements will be stored on the LIFO and dequeued elements will be retrieved from the FIFO until the FIFO runs out. The LIFO will then be reversed into the FIFO while newly-enqueued elements will start a new LIFO, and so on. In this way, the queue order is preserved.

Figure 7:
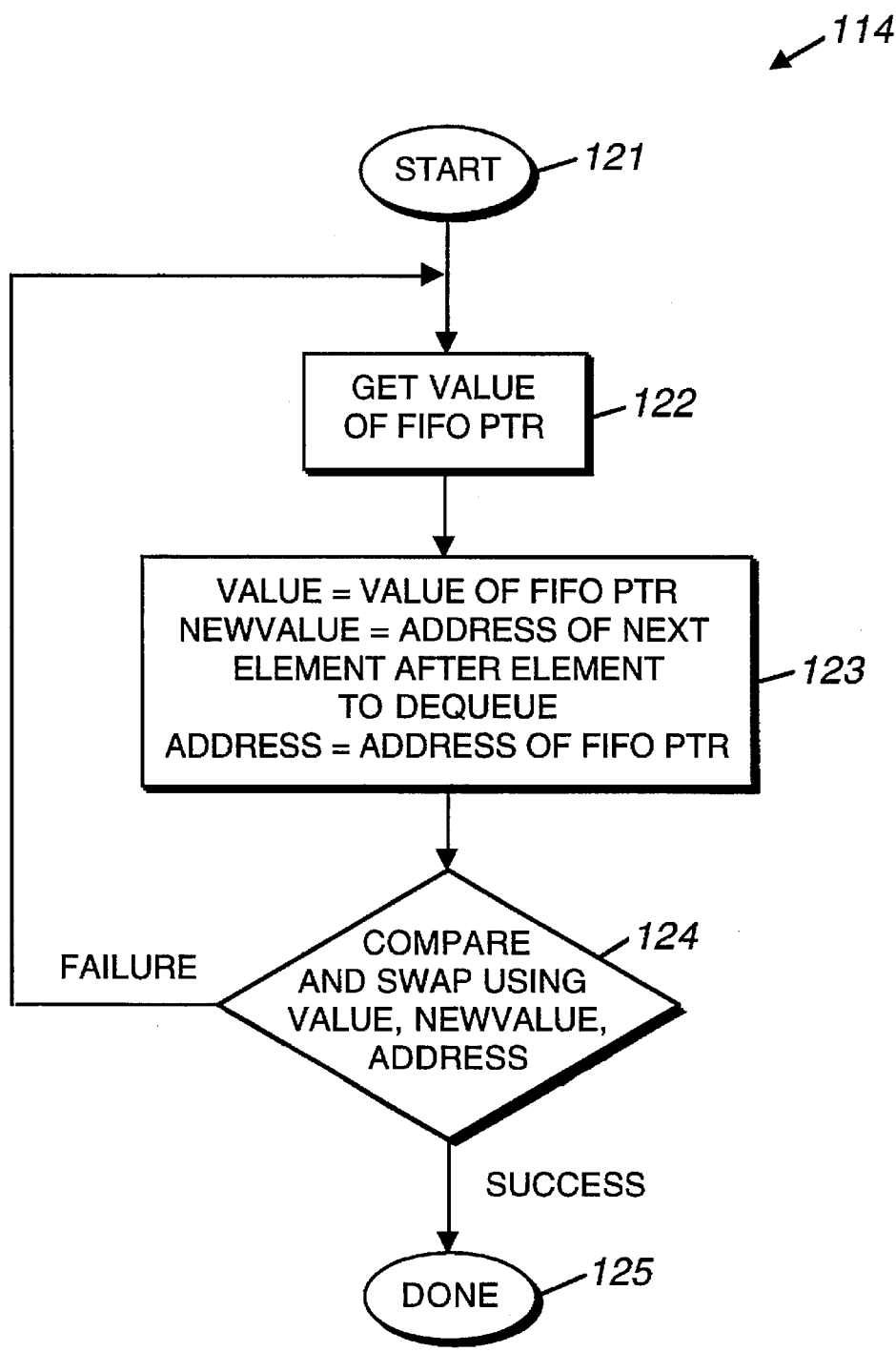
FIG. 7 is a flow diagram illustrating the step of FIG. 6 of atomically dequeuing from the FIFO.

FIG. 7 is a flow diagram illustrating step 114 of FIG. 6, in which an element is atomically dequeued from FIFO list 42. The removed data element is removed from the tail, which is the beginning of the FIFO linked list 42 of data elements pointed to by FIFO pointer 34. The process begins at 121, and in a step 122, the value of FIFO pointer 34 is retrieved, which is the address to which FIFO pointer 34 is pointing. In next step 123, values are assigned to the variables VALUE, NEWVALUE, and ADDRESS. VALUE is assigned to the value of FIFO pointer 34 (i.e., the address pointed to by FIFO pointer 34). NEWVALUE is assigned the address of the next element in linked list 42 that is after the element to dequeue, and ADDRESS is assigned the address of FIFO pointer 36.

In step 124, a compare and swap operation is performed using the values of VALUE, NEWVALUE, and ADDRESS as assigned in step 123. As described above with reference to FIG. 4, the compare and swap operation is an atomic operation that attempts to read an address and swap values uninterrupted by any other access to that address. The compare and swap operation of step 124 compares values of FIFO pointer 34 and either stores a new value in place of the old value or informs the dequeuing process that the comparison was a failure. The compare and swap operation of step 124 is the same as the process described above with respect to FIG. 5 except that different values for VALUE, NEWVALUE, and ADDRESS are used.

If the result of the compare and swap operation is success, then no other interrupting processes have dequeued during the dequeuing process. The FIFO pointer 34 now points to the value of the element after the element to dequeue and the element to dequeue has effectively been removed from linked list 42; the process is thus complete at 125. For example, referring to FIG. 2, if element A1 were to be dequeued from FIFO list 42, then the FIFO pointer 34 would be reassigned to point to element A2. Element A1 would then be passed to the dequeuer in step 108 of FIG. 6. Additional elements would be dequeued in the same fashion.

If result of the compare and swap operation of step 124 is failure, then the process returns to step 122 to again get the value of FIFO pointer 34 and implement the process until success is achieved with the compare and swap of step 124. A failure indicates that the value of FIFO pointer 34 changed due to another dequeuer or interrupt process that has dequeued a data element from FIFO list 42 before step 124 was initiated. In such a case, the previously-retrieved VALUE and the value stored at ADDRESS would not match, causing a failure result.

Figure 8:
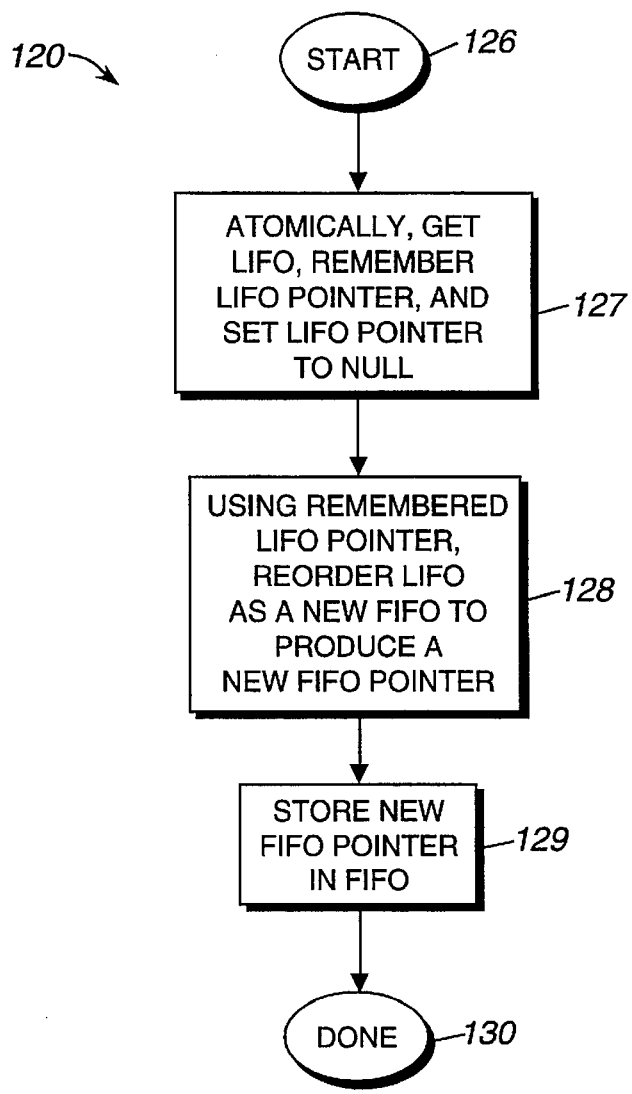
FIG. 8 is a flow diagram illustrating the step of FIG. 6 of converting the LIFO into a new FIFO and putting the new FIFO in the FIFO.

FIG. 8 is a flow diagram illustrating step 120 of FIG. 6, in which the LIFO list 44 is reversed into a new FIFO and put into the FIFO list 42. The process begins at 126, and, in a step 127, the LIFO list is atomically retrieved from memory (and loaded into registers, other memory, etc.), the LIFO pointer's location in memory is remembered (stored for later rise), and the LIFO pointer 36 is set to null. This step is accomplished atomically by comparing and swapping the value in the LIFO pointer 36 (which is the address of the first element of the LIFO linked list) with a value of 0 (null), and is described in greater detail with respect to FIG. 9. In next step 128, the LIFO list 44 is reordered as a FIFO (i.e., the LIFO is reversed) and FIFO pointer 34 is reassigned to point to the new FIFO. This reordering is performed so that the entire LIFO linked list 44 does not have to be scanned every time an element is to be dequeued. The LIFO list can be reversed once in step 128, and the elements can then be dequeued from the front of the linked list in proper queue order. In step 129, the FIFO pointer 34 (which was null) is then assigned to point to the new FIFO created in step 128, and the process is complete at 130. With the reordering complete, an element can be readily dequeued from the linked list pointed to by FIFO pointer 34, while additional data elements can be enqueued into the linked list pointed to by LIFO pointer 36.

Figure 8A:
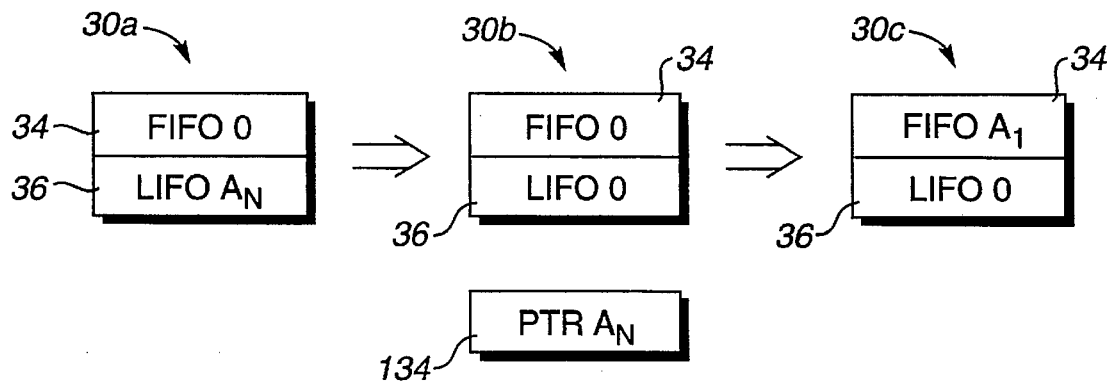
FIG. 8a is a diagrammatic illustration of the pointers of the queue memory structure during the process of FIG. 8.

FIG. 8a shows the process of FIG. 8 in schematic form. Before step 127, as shown in data structure 30a, FIFO pointer 34 of queue memory structure 30 is a null pointer, as determined in step 112 of FIG. 6. The null pointer is indicated by the "0" symbol 132. LIFO pointer 36 points to AN, the last data element enqueued and the first element of linked list 44. Data structure 30b shows the pointers after step 127, in which FIFO pointer 34 is null, LIFO pointer 36 is null, and a remembered LIFO pointer 134 that points to element $A_N$ is stored, for example, in a microprocessor register or other accessible memory. Data structure 30c shows the pointers after step 129, in which FIFO pointer 34 is pointing to $A_1$, the first element in the reordered linked list, and LIFO pointer 36 is null.

Figure 8B:
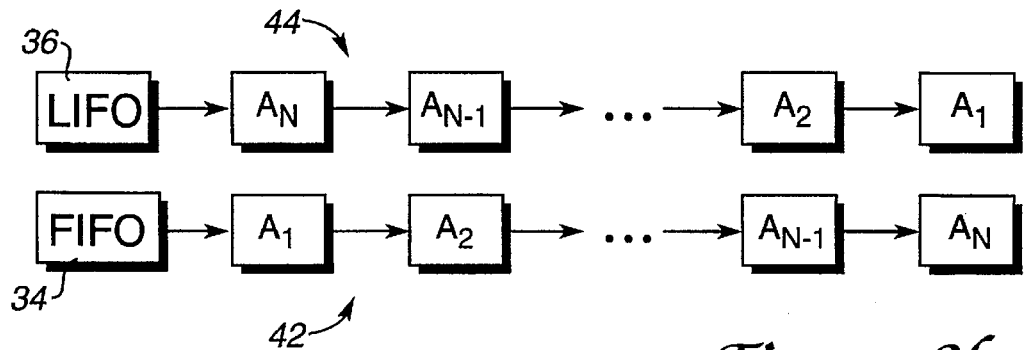
FIG. 8b is a diagrammatic illustration of the data elements of a LIFO and FIFO of the present invention.

In FIG. 8b, a generalized LIFO is shown in which LIFO pointer 36 points to linked list 44 of data elements. The data elements are ordered from $A_N$, the last element to be added to the linked list 44, to $A_1$, the first element added to the linked list. After the LIFO has been reordered in step 128 and assigned to pointer 34 in step 129, it is a FIFO having a FIFO pointer 34 that points to the linked list of elements 42. The data elements are now ordered from $A_1$, the first element added to the list, to $A_N$, the last element to be added to the list. Thus, when an item is dequeued from the list pointer, it is retrieved in proper queue order. Reordering a linked list so that the list is in the reverse order from its previous order is well known to those skilled in the art.

Figure 9:
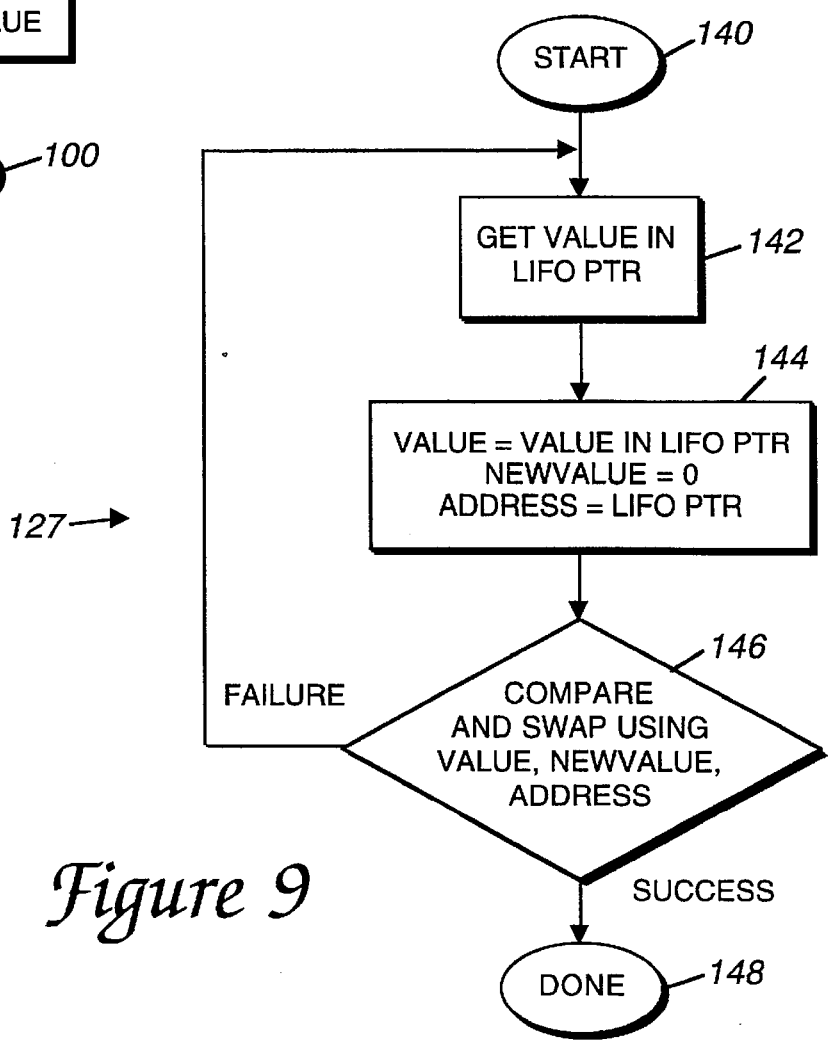
FIG. 9 is a flow diagram illustrating the step of FIG. 8 of atomically getting the LIFO and setting the LIFO pointer to null.

FIG. 9 is a flow diagram illustrating step 127 of FIG. 8, in which the LIFO list is atomically retrieved from memory, the LIFO pointer is remembered, and the LIFO pointer is set to null. The process begins at 140, and, in a step 142, the value in the LIFO pointer is retrieved. In next step 144, the variables VALUE, NEWVALUE, and ADDRESS are assigned. VALUE is assigned to the value of the LIFO pointer 36, i.e., the address pointed to by the LIFO pointer. NEWVALUE is assigned to zero (null), and ADDRESS is assigned to the address of the LIFO pointer 36. In step 146, a compare and swap operation is performed using the values of VALUE, NEWVALUE, and ADDRESS. The compare and swap operation is detailed above with respect to FIG. 5. Basically, the operation compares the value of the LIFO pointer stored in VALUE (in a register, etc.) with the current value at the address of the LIFO pointer. If these values are the same, no other interrupting processes have written over the data in the LIFO pointer memory location and NEWVALUE (null) can be stored in the LIFO, making the LIFO a null pointer. If these values are different, failure is indicated, and the process returns to step 142 to again retrieve the value in the LIFO pointer and compare and swap this value with NEWVALUE. The process is repeated until success is achieved, whereafter the process is complete at 148.

Figure 10:
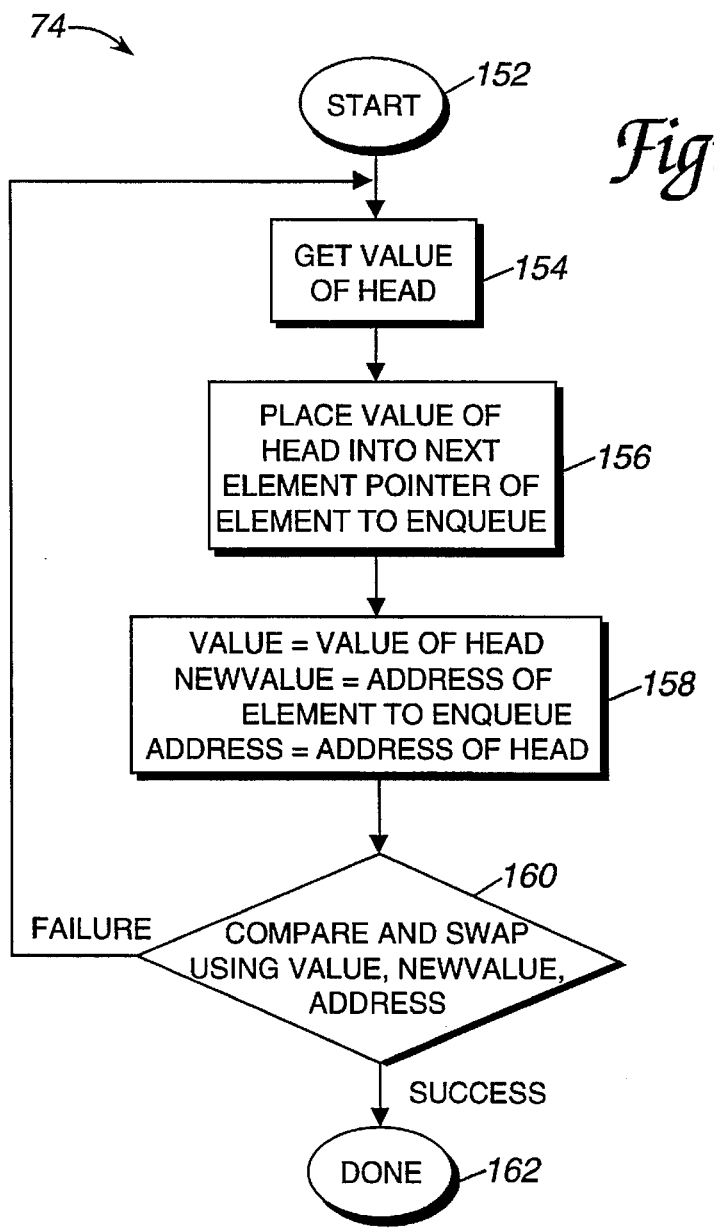
FIG. 10 is a flow diagram illustrating the step of FIG. 3 of atomically removing data from the head of the queue of the present invention.

FIG. 10 is a flow diagram illustrating step 74 of FIG. 3, in which data is entered into the head of the queue data structure 30. This process is substantially similar to the process of FIG. 4 for enqueuing to the LIFO list 44. The process of step 74 is optional, since many implementations of the present invention may not include a head 32 or head list 40. However, head list 40 can be useful when important or critical data needs to be inserted at the front of a queue, such as a user task queue that provides tasks to an operating system. The process begins at 152, and in a step 154, the value of head 32 is retrieved, i.e. the address to which head 32 is pointing. In next step 156, the value of head is placed into the next element pointer of the data element that is to be enqueued into data structure 30. Accordingly, the data element to enqueue now points to the data element that head 32 used to point to. In step 158, values are assigned to VALUE, NEWVALUE, and ADDRESS, which are data items used by next step 160. VALUE is assigned to the value of head 32 (i.e., the address pointed to by head), NEWVALUE is assigned the address of the element to enqueue, and ADDRESS is assigned the address of head 32.

In step 160, a compare and swap operation is performed using the values of VALUE, NEWVALUE, and ADDRESS as assigned in step 158. This operation is described with reference to FIG. 5 above. If result of the compare and swap operation is success, then the new element to enqueue has been inserted at the beginning (head) of the queue memory structure 30 and the process is complete at 162. If result of the compare and swap operation is failure, then the process returns to step 154 to again get the value of head 32 and go through the process until success is achieved with the compare and swap of step 160.

Figure 11:
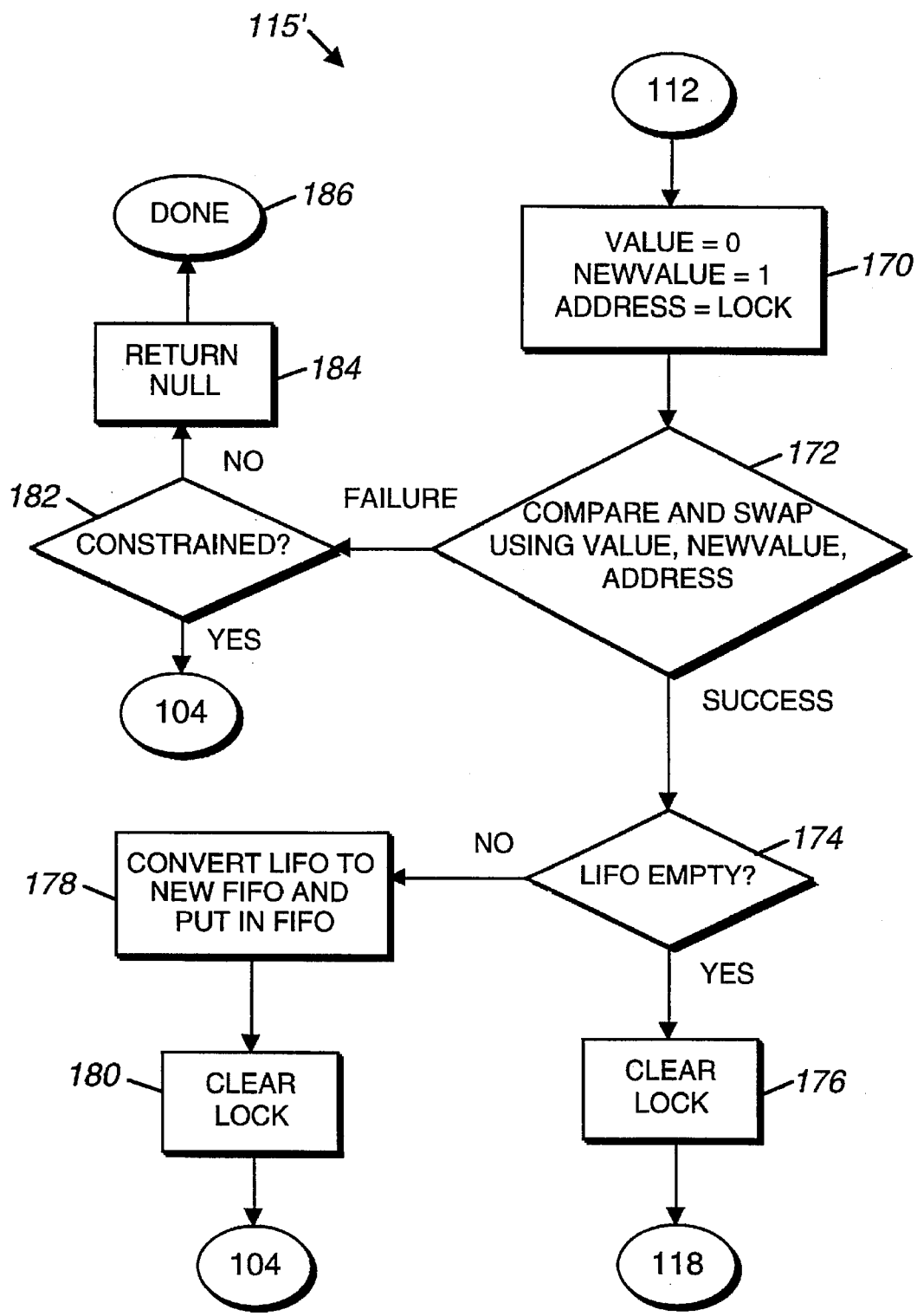
FIG. 11 is a flow diagram illustrating an alternate embodiment of a portion of FIG. 6 for checking a lock of the present invention before converting the LIFO to a FIFO.

FIG. 11 is a flow diagram illustrating an alternate method 115' of implementing steps 116 and 120 as enclosed in the dashed line 115 of FIG. 6. Method 115' can be used in implementations of the present invention in which multiple dequeuers have access to the queue memory structure 30. Such multiple dequeuers can include, for example, additional microprocessors 22, a timeshared single microprocessor 12 running several dequeuing processes, or multiple interrupt handlers performing dequeuing operations. The above-described embodiment of FIG. 6 will not safely function in a multiple dequeuer environment. This is because multiple dequeuers can cause data to become disordered or lost. For example, one dequeuer can dequeue data elements, which will eventually cause step 120 of FIG. 6 to be implemented, where the LIFO linked list is reordered into a FIFO and put into the FIFO list 42. While the reordering of the linked list is occurring, both FIFO pointer 34 and LIFO pointer 36 are null pointers. Another enqueuer or dequeuer can make a call to queue 30 at this time, since the reordering step 126 of FIG. 7 is not atomic. An enqueuer can enqueue data elements onto LIFO list 44 during this reordering process. Similarly, a second dequeuer can attempt to dequeue while the LIFO list is being reordered for the first dequeuer. The second dequeuer will see that the FIFO list 42 is empty and will thus reorder the new elements and place the reordered list into the FIFO list 42. Thus, the second dequeuer may receive a wrong new element instead of the correct element of the reordered list. If so, the first dequeuer will also receive a wrong data element, since the second dequeuer received the element that the first dequeuer was supposed to receive.

In another situation where data is lost, the second dequeuer can attempt to dequeue while the first dequeuer is reordering LIFO list 44. The first dequeuer finishes the reordering process and places its list in FIFO list 42. Meanwhile, the second dequeuer has started reordering additional elements that have been enqueued while the first list was being reordered (similar to the situation described above). The second dequeuing process finishes reordering its list and places the list in FIFO list 42 in place of the first list. The data elements of the first list are thus lost.

To avoid such data ordering and security problems when multiple dequeuers are used, the lock 38 as described in FIG. 2 can be used. This lock, when set, tells a second dequeuer that another dequeuer is accessing data (reordering a list, etc.), and that, therefore, the second dequeuer cannot access any data. This process is described below.

The process 115' begins after the affirmative branch from step 112 of FIG. 6. In step 170, the variables VALUE, NEWVALUE, and ADDRESS are assigned. VALUE is set to 0, NEWVALUE is set to 1, and ADDRESS is the address of lock pointer 38. In next step 172, a compare and swap is performed as detailed in FIG. 5. This compare and swap operation atomically checks the lock flag 46. If the lock flag is zero (i.e., if VALUE is equal to the value in the lock flag), then no other dequeuer is currently dequeuing a data element from the memory structure. The lock flag is then atomically set to 1 (NEWVALUE) to indicate that a dequeuer is now accessing a data element; this is the successful compare and swap. If the lock flag is found to be already set to 1, another dequeuer is currently accessing the memory structure 30; the compare and swap is a failure. In alternate embodiments, other atomic operations, such as "test and set", can be used in step 172 instead of compare and swap. The use of such other atomic instructions are well-known to those skilled in the art.

If the compare and swap was a success in step 172, then the LIFO list 44 is checked if it is empty in step 174. If the LIFO is empty, then no data elements are stored in the memory structure to dequeue, and the lock flag 46 is cleared (set to zero) in step 176. The process then continues to step 118 of FIG. 6, where a null is returned to the dequeuer and the process is complete.

If the LIFO is not empty in step 174, then step 178 is implemented, in which the LIFO list 44 is converted into a FIFO linked list 42. This is accomplished as described above with reference to step 120 of FIG. 6. The reordered FIFO linked list is then placed in the FIFO list 42 and the LIFO pointer 36 is set to null. The lock 38 is then cleared in step 180, and the process returns to step 104 of FIG. 6. The first element of the FIFO list 42 is then dequeued in step 112 of FIG. 6, as described above.

If the compare and swap operation 172 was a failure, then step 182 is implemented, in which the process is checked if it is constrained. A constrained process would include constraints that are applied to dequeuers so that additional information or actions can be supplied by the process of the present invention when a failed compare and swap occurs in step 172. If the process is not constrained, then the process is the most general, i.e., process 115' applies to all conditions and dequeuers. If such is the case, then step 184 is implemented, where a null is returned to the dequeuer, and the process is complete as indicated at 186. Thus, if the lock has been set by another dequeuer so that the compare and swap fails, the second (current) dequeuer receives the null in step 184 indicating that the queue memory structure 30 is empty and thus includes no data elements to dequeue. This result is the most general in that it will satisfy any dequeuer, including an interrupt routine, other microprocessor, or other process. This can prevent certain problems that can occur such as "deadlock", for example, if interrupt routines are dequeuing. For example, a first dequeuer gets the LIFO list, sets the lock, and begins reordering the LIFO list. Meanwhile, a second dequeuer that is an interrupt routine dequeues. This halts the reordering process of the first dequeuer since the interrupt routine has a higher priority. However, the lock is still set from the first dequeuer. If the interrupt routine is permitted to simply wait until the lock clears before dequeuing, it will wait forever, since the first dequeuer will never finish its reordering/dequeuing and the lock will never be cleared; this is known as deadlock. To prevent this problem, the second dequeuer (the interrupt routine) is told that the queue is empty in step 184, thus allowing the first dequeuer to finish reordering the LIFO list and dequeue a data element.

However, if the process is found to be constrained in step 182, then a second dequeuer can be allowed, for example, to wait until the lock is cleared before dequeuing or can be told specific information. A variety of different constraints can allow certain processes to wait for a cleared lock while telling other processes that the queue is empty. A constrained process may, for example, not allow interrupt routines to dequeue from queue 30, so that the above-described deadlock problem can be avoided. If such a constraint is in place, the process continues from step 182 to step 104 of FIG. 6, in which the dequeue procedure is again undertaken. That is, the process will continually try to dequeue until the lock is cleared and the queue is made available. Other constraints can be imposed on a system to work in conjunction with the process of the present invention. For example, user tasks can be constrained to not interrupt each other to prevent the deadlock of a second dequeuer described above.

A second (or third, etc.) dequeuer can also be told a variety of different information related to the locked queue. For example, a second dequeuer can be given a time period to wait before checking again whether the lock is cleared.

Alternatively, a second dequeuer can be told that the queue is currently being used, but that there are data elements stored that are available to be dequeued. In a different constrained system having multiple processors, each processor can have an identification tag. If a second dequeuer finds that the lock is set, the second dequeuer can be given the identification of the processor that set the lock. In such a system, for example, if an interrupt routine tries to dequeue and finds that the lock is set, and then discovers that the processor that is using the queue is the same processor that the interrupt handler is running on, the interrupt routine can be told that the queue is empty. If the interrupt routine is running on a different processor, however, then it can be told to wait until the lock is cleared, since the interrupt routine will not be able interrupt the first dequeuer and cause its dequeuing process to halt. Other information can be told to dequeuers relating to the processor identification. Other constraints might cause a second dequeuer to wait only if the second dequeuer is not a timeshared process on a single processor, is not an interrupt routine on a single processor, has a specific microprocessor identification, etc.

While this invention has been described in terms of several preferred embodiments, it is contemplated that alterations, modifications and permutations thereof will become apparent to those skilled in the art upon a reading of the specification and study of the drawings. For example, the queue memory structure of the present invention can be a general-purpose queue or can be used for a variety of different specific tasks. In addition, the atomic operations of the present invention can be implemented using a variety of different methods as specifically required by a computer architecture, operating system, etc. Also, the constrained process of the present invention for use with multiple dequeuers can be provided with a variety of different constraints to allow dequeuers several options when discovering a locked queue as specific to user needs. Furthermore, certain terminology has been used for the purposes of descriptive clarity, and not to limit the present invention. It is therefore intended that the following appended claims include all such alterations, modifications and permutations as fall within the true spirit and scope of the present invention.

What is claimed is:

1. A method for storing and retrieving data from a queue implemented on a computer system, the method comprising:
    (a) allocating a queue memory structure in a memory device, said memory structure having a last-in-first-out list (LIFO) and a first-in-first-out list (FIFO);
    (b) atomically adding a data element to said LIFO when said data element is enqueued to said queue memory structure;
    (c) atomically removing a data element from said FIFO when said data element is to be dequeued from said queue memory structure; and
    (d) converting said LIFO to a new FIFO and storing said new FIFO as said FIFO when said FIFO is empty.

2. A method as recited in claim 1 wherein said converting said LIFO to a new FIFO includes atomically removing data elements of said LIFO from said memory structure and reversing said removed data elements to create said new FIFO.

3. A method as recited in claim 2 further comprising adding a data element to a head list when said data element is to be added to a front of said queue memory structure.

4. A method as recited in claim 3 wherein said adding a data element to said head list is performed atomically.

5. A method as recited in claim 3 further comprising atomically removing a data element from said head list when a data element is to be removed from said front of said queue memory structure.

6. A method as recited in claim 1 wherein a dequeuer performs said converting step, and further comprising setting a lock when said lock is clear before converting said LIFO to a new FIFO, said lock indicating that said LIFO is being converted to said new FIFO such that said queue memory structure may not be accessed by other dequeuers while said dequeuer is converting said LIFO.

7. A method as recited in claim 6 wherein said setting said lock is performed atomically.

8. A method as recited in claim 7 wherein said atomically setting said lock is implemented with a compare and swap operation.

9. A computer apparatus with a queue memory structure comprising:
   a digital processor;
   read/write memory coupled to a digital processor;
   means for providing a queue memory structure in said read/write memory, said queue memory structure implementing a last-in-first-out list (LIFO) and a first-in-first-out list (FIFO);
   means for enqueuing a data element to said queue memory structure by atomically adding said data element to said LIFO;
   means for dequeuing a data element from said queue memory structure by atomically removing said data element from said FIFO; and
   means for converting said LIFO to a new FIFO when said FIFO is empty.

10. A computer apparatus as recited in claim 9 wherein said LIFO includes data elements stored as a LIFO linked list and LIFO pointer pointing to said LIFO linked list of data elements.

11. A computer apparatus as recited in claim 10 wherein said FIFO includes data elements stored as a FIFO linked list and a FIFO list pointer pointing to said FIFO linked list of data elements.

12. A computer apparatus as recited in claim 11 wherein said queue memory structure includes a head list and means for adding a data element to a front of said queue memory structure by adding said data element to said head list.

13. A computer apparatus as recited in claim 11 wherein a plurality of enqueuers and dequeuers have access to said queue memory structure.

14. A computer apparatus as recited in claim 13 wherein said means for converting said LIFO to a new FIFO includes means for atomically checking a lock and means for setting said lock and converting said LIFO to a new FIFO when said lock is not set.

15. A method for enqueuing and dequeuing data on a computer system comprising the steps of:
   atomically enqueuing data to a queue memory structure when a call to enqueue is received by said computer system, such that said enqueuing step cannot be interrupted by different enqueuers attempting to enqueue data to said queue memory structure, wherein said step of atomically enqueuing data to said queue memory structure includes inserting said data into a a LIFO; and
   atomically dequeuing data from said queue memory structure when a call to dequeue is received by said computer system, such that said dequeuing step cannot be interrupted by different dequeuers attempting to dequeue data from said queue memory structure, wherein said step of atomically dequeuing data from said queue memory structure includes removing said data from a FIFO and converting said LIFO into said FIFO;
   whereby said enqueuing and dequeuing steps are performed without altering the level of interrupts used on said computer system and without risk of deadlock.

16. A method as recited in claim 15 wherein said step of atomically dequeuing data includes atomically checking and setting a lock flag before converting said LIFO into said FIFO, wherein said step of convening said LIFO into said FIFO is not performed when said lock flag has been previously set.

17. A method as recited in claim 16 wherein said step of atomically enqueuing data includes enqueuing data to a head list of said queue data structure when said call to enqueue is a call to enqueue data to said head of said queue memory structure.

18. A method as recited in claim 17 wherein said step of atomically dequeuing data includes dequeuing data from said head list of said queue data structure when said call to dequeue is a call to dequeue from said head of said queue memory structure.

19. A method as recited in claim 16 wherein said step of atomically dequeuing data is performed by a plurality of dequeuers having access to said queue memory structure.

20. A method as recited in claim 19 wherein said plurality of dequeuers include a plurality of microprocessors.

21. A method as recited in claim 20 wherein when one of said dequeuers is dequeuing data and has set said lock flag, a second one of said dequeuers is informed that said queue memory structure is empty.

22. A method as recited in claim 20 wherein when one of said dequeuers is dequeuing data and has set said lock flag, a second one of said dequeuers is informed to wait before attempting to perform said dequeuing step.

23. A computer system for providing a queue memory structure, the system comprising:
   a LIFO for storing data elements input to said queue memory structure;
   a FIFO list for storing data elements to be output from said queue memory structure;
   means for converting said LIFO to said FIFO;
   a plurality of enqueuers, each enqueuer for storing data elements in said LIFO, wherein one of said enqueuers cannot be interrupted by other enqueuers accessing said queue memory structure when said enqueuer is storing said data elements; and
   a plurality of dequeuers, each dequeuer for retrieving data elements from said FIFO, wherein one of said dequeuers cannot be interrupted when retrieving said data elements by other dequeuers accessing said queue memory structure;
   whereby said dam elements are stored and retrieved in a first-in-first-out order without altering the level of interrupts used on said computer system and without risk of deadlock.

24. A computer system as recited in claim 23 wherein said means for converting said LIFO to said FIFO list includes means for reversing said LIFO to create said FIFO.

25. A computer system as recited in claim 24 wherein said enqueuer atomically stores said data elements in said LIFO.

26. A computer system as recited in claim 24 wherein said dequeuer atomically retrieves said data elements from said FIFO list.

27. A computer system as recited in claim 26 further comprising a head list for storing data elements enqueued to a front of said queue memory structure.

28. A computer system as recited in claim 27 wherein said dequeuer is an interrupt routine.

29. A computer system as recited in claim 28 wherein said plurality of dequeuers include a plurality of different microprocessors.

30. A computer system as recited in claim 26 further comprising means for atomically checking and setting a lock when said means for converting converts said LIFO to said FIFO, said lock indicating to other dequeuers that said queue memory structure is being accessed by a dequeuer and preventing said other dequeuers from accessing said queue memory structure.

31. A computer readable medium including program instructions for storing and retrieving data from a queue memory structure, wherein a plurality of enqueuers and at least one dequeuer have access to said queue memory structure, said program instructions performing steps comprising:

(a) allocating a queue memory structure in a memory device, said memory structure having a last-in-first-out list (LIFO) and a first-in-first-out list (FIFO);

(b) atomically adding a data element to said LIFO from an enqueuer when said dam element is enqueued to said queue memory structure, such that said adding is performed without interruption from other enqueuers adding data elements to said LIFO;

(c) atomically removing a data element from said FIFO to a dequeuer when said data element is to be dequeued from said queue memory structure; and (d) converting said LIFO to a new FIFO and storing said new FIFO as said FIFO when said FIFO is empty, said converting and storing step performed by said dequeuer.

32. A computer readable medium as recited in claim 31 wherein said step of converting said LIFO to a new FIFO includes atomically removing data elements of said LIFO from said memory structure and reversing said removed data elements to create said new FIFO.

33. A computer readable medium as recited in claim 32 wherein a plurality of dequeuers may access said queue memory structure, and wherein said program instructions further perform a step of atomically setting a lock when said lock is clear before converting said LIFO to a new FIFO, said lock indicating that said LIFO is being converted to said new FIFO such that said queue memory structure may not Be accessed by different dequeuers while said dequeuer is dequeuing or converting said LIFO.

34. A computer readable medium as recited in claim 33 wherein said removing a data element from said FIFO is not interrupted by other dequeuers removing data elements from said queue memory structure.

35. A computer readable medium as recited in claim 34 wherein when one of said dequeuers is dequeuing data and has set said lock, a second one of said dequeuers is informed that said queue memory structure is empty.

36. A computer readable medium as recited in claim 32 wherein said program instructions further perform a step of atomically adding a data element to a head list by said enqueuer when said data element is to be added to a front of said queue memory structure such that said adding said element to said head list is performed without interruption by other enqueuers or dequeuer.

37. A computer readable medium as recited in claim 36 wherein said program instructions further perform a step of atomically removing a data element from said head list when a data element is to be removed from said front of said queue memory structure such that said removing said element from said head list is performed without interruption.

38. A computer readable medium as recited in claim 34 wherein when one of said dequeuers is dequeuing data and has set said lock flag, a second one of said dequeuers is informed to wait before attempting to perform said dequeuing step.

39. A queue memory structure accessible by a plurality of enqueuers and dequeuers implemented in a computer system, the queue memory structure comprising:

a read/write memory device coupled to said computer system for providing said queue memory structure;

a LIFO structure implemented in said read/write memory for storing data elements input to said queue memory structure by an enqueuer, wherein said LIFO is atomically accessed by said enqueuer such that said enqueuer cannot be interrupted by other enqueuers accessing said queue memory structure when said enqueuer is storing said data elements;

a FIFO list implemented in said read/write memory for storing data elements to be output from said queue memory structure by a dequeuer, wherein said LIFO is atomically accessed by said enqueuer such that said enqueuer cannot be interrupted by other enqueuers accessing said queue memory structure when said enqueuer is storing said data elements, and wherein said LIFO is reversed to create said FIFO by said dequeuer when said FIFO is empty; and a lock flag implemented in a memory device coupled to said computer system that can be set by a dequeuer accessing said queue memory structure, said lock indicating that said queue memory structure is currently being accessed and may not be accessed by different dequeuers while said lock is set, whereby said data elements in said queue memory structure are stored and retrieved in a first-in-first-out order without altering the level of interrupts used on said computer system and without risk of deadlock.

40. A queue memory structure as recited in claim 39 wherein at least one of said dequeuers is an interrupt routine.

41. A queue memory structure as recited in claim 39 wherein said plurality of dequeuers include a plurality of different microprocessors.

42. A queue memory structure as recited in claim 39 further comprising a head list, such that a data element is atomically added to said head list by an enqueuer when said data element is to be added to a front of said queue memory structure, such that said adding said element to said head list is performed without interruption by other enqueuers or dequeuers, and such that a data element is atomically removed from said head list by a dequeuer when a data element is to be removed from said front of said queue memory structure, such that said removing said element from said head list is performed without interruption by other enqueuers or dequeuers.

43. A queue memory structure as recited in claim 39 wherein said LIFO includes data elements stored as a LIFO linked list and LIFO pointer pointing to said LIFO linked list of data elements, and wherein said FIFO includes data elements stored as a FIFO linked list and a FIFO list pointer pointing to said FIFO linked list of data elements.

* * * * *

UNITED STATES PATENT AND TRADEMARK OFFICE
CERTIFICATE OF CORRECTION

PATENT NO     :      5,671,446

DATED         :      September 23, 1997

INVENTOR(S)   :      Rakity, et al.

It is certified that error appears in the above-identified patent and that said Letters Patent is hereby corrected as shown below:

In the claims:

Claim 31, Column 19, line 15, please delete "dam" and replace with - -data- -.

Claim 33, Column 19, line 38, please replace "Be" with - -be- -.

Signed and Sealed this

Twenty-second Day of June, 1999

Attest:

Q. TODD DICKINSON

*Attesting Officer*         *Acting Commissioner of Patents and Trademarks*